(12) United States Patent
Sheppard et al.

(10) Patent No.: US 10,754,364 B2
(45) Date of Patent: Aug. 25, 2020

(54) MULTI-STAGE BY-PASS VALVE (71) Applicant: DANA CANADA CORPORATION, Oakville (CA)

(72) Inventors: Jeff Sheppard, Milton (CA); Sachin Bhatia, Mississauga (CA)

(73) Assignee: Dana Canada Corporation, Oakville (CA)

( * ) Notice: Subject to any disclaimer, the term of this patent is extended or adjusted under 35 U.S.C. 154(b) by 84 days.

(21) Appl. No.: 15/770,279

(22) PCT Filed: Oct. 27, 2016

(86) PCT No.: PCT/CA2016/051243
§ 371 (c)(1),
(2) Date: Apr. 23, 2018

(87) PCT Pub. No.: WO2017/070782
PCT Pub. Date: May 4, 2017

(65) Prior Publication Data
US 2018/0299913 A1  Oct. 18, 2018

Related U.S. Application Data (60) Provisional application No. 62/246,911, filed on Oct. 27, 2015.

(51) Int. Cl.
*G05D 23/185* (2006.01)
*F01P 7/16* (2006.01)
(Continued)

(52) U.S. Cl.
CPC ............ *G05D 23/1852* (2013.01); *F01P 7/16* (2013.01); *F16K 31/002* (2013.01); *F01P 2007/146* (2013.01); *F01P 2037/02* (2013.01)

(58) Field of Classification Search
CPC ....... G05D 23/1852; G05D 23/02; F01P 7/16; F01P 2007/146
See application file for complete search history.

(56) References Cited

U.S. PATENT DOCUMENTS 3,473,566 A * 10/1969 Peppel .................... F15B 13/06
137/596.2
3,545,479 A * 12/1970 Loe ........................ F16K 11/065
137/360

(Continued)

FOREIGN PATENT DOCUMENTS

| CN | 102425687 A | 4/2012 |
|----|-------------|--------|
| JP | 53165322 U | 12/1978 |

OTHER PUBLICATIONS

Canadian Intellectual Property Office, International Search Report with Written Opinion, issued in PCT/CA2016/051243, Dec. 20, 2016, 7 pages, Canadian Intellectual Property Office, Gatineau, Quebec, Canada.

(Continued)

*Primary Examiner* — Nelson J Nieves
(74) *Attorney, Agent, or Firm* — Ridout and Maybee LLP (57) ABSTRACT

A by-pass valve capable of activating at least two different temperatures is disclosed. The valve has a valve chamber housing a valve mechanism having a piston-cylinder arrangement. The cylinder defines two separate chambers therein for housing two different thermal materials each having a different activation temperature. A piston is arranged in each end of the cylinder operably coupled to the corresponding thermal material housed within the cylinder. A valve spool or valve sleeve is operably coupled to one of the pistons associated with the valve mechanism, the valve spool or sleeve adapted for sliding within the valve chamber for controlling flow to the fluid outlet ports formed in the valve. In some embodiments, the valve mechanism housing (Continued)

two different thermal materials can be arranged in combination with additional valve mechanism housing different thermal materials allowing for further multi-stage activation allowing for various flow arrangements through the valve.

19 Claims, 9 Drawing Sheets

(51) Int. Cl.
  *F16K 31/00* (2006.01)
  *F01P 7/14* (2006.01)

(56) References Cited

U.S. PATENT DOCUMENTS

| | | | |
|---|---|---|---|
| 3,927,830 A | 12/1975 | Briski | |
| 4,488,680 A * | 12/1984 | Itoh | G05D 23/132 236/100 |
| 5,400,823 A * | 3/1995 | Elmer | F16D 35/021 137/112 |
| 7,124,715 B2 | 10/2006 | Hutchins | |
| 7,152,416 B2 * | 12/2006 | Lifson | F16K 11/0655 62/160 |
| 9,133,952 B2 | 9/2015 | Lamb et al. | |
| 2003/0136855 A1 * | 7/2003 | Brown | F01M 5/007 236/101 R |
| 2012/0091212 A1 * | 4/2012 | Guilhamat | F01P 7/16 236/34.5 |
| 2012/0103577 A1 * | 5/2012 | Heldberg | F01P 7/16 165/121 |
| 2012/0247582 A1 * | 10/2012 | Lamb | F16K 11/044 137/468 |
| 2013/0126624 A1 * | 5/2013 | Park | F16K 1/36 236/34.5 |
| 2013/0213600 A1 * | 8/2013 | Saitoh | F01P 7/165 165/11.1 |
| 2013/0319634 A1 * | 12/2013 | Sheppard | F28F 27/00 165/96 |
| 2014/0317923 A1 * | 10/2014 | Neal | F01M 5/00 29/888.011 |
| 2015/0027551 A1 * | 1/2015 | Graves | F03G 7/065 137/2 |
| 2015/0053778 A1 * | 2/2015 | Uhman | F16K 11/044 236/34.5 |
| 2015/0315941 A1 * | 11/2015 | Kim | F01M 5/007 236/34.5 |
| 2016/0109890 A1 * | 4/2016 | Styron | F01P 7/16 236/34.5 |
| 2016/0130993 A1 * | 5/2016 | Ebneral | F16K 31/002 123/41.33 |
| 2016/0224037 A1 * | 8/2016 | Qiu | F01M 5/007 |
| 2016/0281587 A1 * | 9/2016 | Arbel | F01P 7/165 |
| 2016/0349770 A1 * | 12/2016 | Sheppard | F16K 31/002 |
| 2017/0074155 A1 * | 3/2017 | Shimomura | F01P 7/16 |
| 2017/0089250 A1 * | 3/2017 | Kanzaka | F01P 3/02 |
| 2017/0175613 A1 * | 6/2017 | Poisson | F01P 7/165 |
| 2017/0285669 A1 * | 10/2017 | Ruoff | F01P 7/16 |
| 2017/0308105 A1 * | 10/2017 | Roman | G05D 23/022 |

OTHER PUBLICATIONS

Chinese Office Action in Application No. 201680076193.6 dated Apr. 8, 2019.

* cited by examiner

MULTI-STAGE BY-PASS VALVE

CROSS-REFERENCE TO RELATED APPLICATION

This application claims priority to and the benefit of U.S. Provisional Patent Application No. 62/246,911 filed Oct. 27, 2015, the contents of which are incorporated herein by reference.

TECHNICAL FIELD

The specification relates to a valve, in particular a thermal by-pass valve that can be actuated at various different temperatures providing multiple operational states.

BACKGROUND

The use of valves to control the flow of a fluid within an overall heat exchange circuit within an automobile system is known. Control valves or thermal by-pass valves (TBV) are often used in combination with heat exchangers to either direct a fluid to a corresponding heat exchanger for heating or cooling, or to direct the fluid elsewhere in the heat exchange circuit so as to by-pass the heat exchanger under conditions where the heat transfer function of the heat exchanger is not required or is only intermittently required. Control valves or thermal by-pass valves are also often used in automobile systems to sense the temperature of a particular fluid so as to either direct it to an appropriate heat exchanger in order to assist with either (i) maintaining an automobile system fluid within an optimal temperature range or (ii) bringing the temperature of the automobile fluid to within the optimal operating range, for example.

Control valves or thermal by-pass valves are often incorporated into a heat exchange system by way of external fluid lines that are, in turn, connected to an inlet/outlet of a heat exchanger, the control valves being separate to the heat exchanger and being connected either upstream or downstream from the heat exchanger within the external fluid lines. In some applications, multiple control valves or thermal by-pass valves are used in combination in order to achieve a particular control sequence to effectively dictate the fluid flow through the overall heat exchange circuit to ensure that the fluid is directed to the appropriate heat exchanger or automobile system component under the various operating conditions.

Current mechanical thermal by-pass valves typically have two operational states, e.g. either "on" or "off", with incremental or staged actuation of a single valve being difficult to achieve with mechanical actuation mechanisms. Combining and interconnecting various individual valves in order to achieve a particular actuation sequence can add to the overall costs associated with the automobile system and can also give rise to multiple potential points of failure and/or leakage. Space and or size constraints for a particular system may also be hindered by requiring multiple individual valves that act in combination in order to achieve a desired operation or control sequence. Accordingly, a single by-pass valve capable of providing multiple operational states and responding to various operating conditions by actuating at a first predetermined temperature and again at a second, different predetermined temperature, for example, may contribute to overall cost savings, space savings, weight savings and/or operational efficiencies and are, therefore, desirable.

SUMMARY OF THE INVENTION

In accordance with an example embodiment of the present disclosure there is provided a by-pass valve comprising a housing defining a valve chamber therein having a central axis; a fluid inlet in fluid communication with the valve chamber; a first fluid outlet arranged downstream from the fluid inlet, the first fluid outlet being in fluid communication with the valve chamber; a second fluid outlet arranged downstream from the first fluid outlet in fluid communication with the valve chamber; at least one temperature responsive valve mechanism arranged within the valve chamber for controlling flow to the first and second fluid outlets, the at least one valve mechanism comprising an outer housing having a first chamber formed therein for housing a first thermal material having a first activation temperature and a second chamber formed therein for housing a second thermal material having a second activation temperature; a first piston disposed along the central axis and adapted for reciprocating movement with respect to the first chamber and operably coupled to the first thermal material; and a second piston disposed along the central axis and adapted for reciprocating movement with respect to the second chamber and operably coupled to the second thermal material; a valve member operably coupled to one of the first or second pistons for movement along the central axis for opening and closing the first and second fluid outlets; wherein the by-pass valve has a first activation temperature associated with the first thermal material and a second activation temperature associated with the second thermal material therefore providing at least three different operational states.

In an embodiment, there is provided a by-pass valve for controlling flow of a control fluid, comprising: a housing defining a valve chamber therein having a central axis; a fluid inlet in fluid communication with said valve chamber; a first fluid outlet arranged downstream from said fluid inlet along said central axis, the first fluid outlet being in fluid communication with said valve chamber; a second fluid outlet arranged downstream from said first fluid outlet along said central axis, the second fluid outlet being in fluid communication with said valve chamber; at least one temperature responsive valve mechanism arranged within said valve chamber for controlling flow of the control fluid to said first and second fluid outlets; a valve member operably coupled to said at least one temperature responsive valve mechanism for movement along said central axis for opening and closing said first and second fluid outlets; wherein said at least one temperature responsive valve mechanism is operable between a first operable position, wherein one of said first and second fluid outlets is in fluid communication with said fluid inlet while the other of said first and second fluid outlets is fluidly isolated from said fluid inlet; and a second operable position wherein fluid communication between the fluid inlet and the other of the first and second fluid outlets is established; and wherein said by-pass valve has at least a first operational state, a second operational state and a third operational state, as determined by the position of the at least one temperature responsive valve mechanism.

In an embodiment, the at least one temperature responsive valve mechanism is in a neutral position at control fluid temperatures below a first activation temperature; the first operable position of the at least one temperature responsive valve mechanism is provided at control fluid temperatures at or above the first activation temperature; and the second operable position of the at least one temperature responsive valve mechanism is provided at control fluid temperatures at or above a second activation temperature which is higher than the first activation temperature.

In an embodiment, the by-pass valve is in the first operational state with the at least one temperature responsive valve mechanism in the neutral position; the by-pass valve is in the second operational state with the at least one temperature responsive valve mechanism in the first operational position; and the by-pass valve is in the third operational state with the at least one temperature responsive valve mechanism in the second operational position.

In an embodiment, in the first and third operational states, fluid communication is established between the fluid inlet and the first fluid outlet and the second fluid outlet is closed by the valve element; and in the second operational state, fluid communication is established between the fluid inlet and the second fluid outlet and the first outlet is closed by the valve element.

In an embodiment, said valve member is in the form of a valve spool which is slidably arranged within the valve chamber, the valve spool having first and second ends having an outer diameter that generally corresponds to the inner diameter of said valve chamber, the first and second ends being spaced apart by an intermediate portion having a smaller diameter than said first and second ends, wherein the first end is located proximate to the fluid inlet and is located upstream of the second end.

In an embodiment, the second end of the valve spool is formed with a recess for receiving an end of a return spring that is arranged within the valve chamber.

In an embodiment, at least one first flow-through opening is formed in and extends through the first end of the valve spool parallel to the central axis, the at least one first flow-through opening providing fluid communication between the fluid inlet and the intermediate portion of the valve spool.

In an embodiment, in the first and second operational states, fluid communication between the fluid inlet and one of the first and second fluid outlets is provided through the at least one first flow-through opening and the intermediate portion of the valve spool, and in the third operational state the first fluid outlet is closed by the first portion of the valve spool.

In an embodiment, in the first operational state, the second fluid outlet is closed by the second portion of the valve spool.

In an embodiment, in the first operational state, the first fluid outlet is closed by the valve member, and fluid communication is established between the fluid inlet and the second fluid outlet; in the second operational state, fluid communication is established between the fluid inlet and both the first and second fluid outlets; and in the third operational state, the second fluid outlet is closed by the valve member, and fluid communication is established between the fluid inlet and the first fluid outlet.

In an embodiment, said valve member is a valve sleeve slidably arranged within the valve chamber and operably coupled to said valve mechanism for controlling flow to said first and second fluid outlets in the at least three operational states.

In an embodiment, said valve sleeve is generally cylindrical, having an outer diameter sized to correspond to an inner diameter of the valve chamber, the valve sleeve having a first end engaging the valve mechanism, the first end being provided with at least one flow-through opening to allow the control fluid to pass through the first end, the valve sleeve also having an open second end for receiving an end of a return spring.

In an embodiment, said at least one valve mechanism is a thermal motor comprising: an outer housing arranged within the valve chamber in close proximity to the fluid inlet, the outer housing having a first chamber formed therein housing a first thermal material and a second chamber formed therein housing a second thermal material; a first piston disposed along said central axis and adapted for reciprocating movement with respect to said first chamber and operably coupled to said first thermal material; and a second piston disposed along said central axis and adapted for reciprocating movement with respect to said second chamber and operably coupled to said second thermal material; wherein the first thermal material expands upon being heated to a temperature at or above a first activation temperature and contracts upon being cooled below said first activation temperature; and wherein the second thermal material expands upon being heated to a temperature at or above a second activation temperature which is higher than the first activation temperature, and contracts upon being cooled below said second activation temperature.

In an embodiment, the first piston is arranged to abut against an end wall of the valve chamber, proximate to the fluid inlet, and the second piston is arranged to abut against the valve member.

In an embodiment, said first piston is adapted to extend along said central axis in response to said first thermal material being heated to a temperature at or above the first activation temperature and to retract upon being cooled below said first activation temperature, and wherein said second piston is adapted to extend along said central axis in response to said second thermal material being heated to a temperature at or above the second activation temperature and to retract upon being cooled below said second activation temperature.

In an embodiment, said first and second pistons are arranged at opposed ends of said outer housing of said valve mechanism.

In an embodiment, said valve mechanism is a first valve mechanism, said by-pass valve further comprising a second valve mechanism arranged in series with said first valve mechanism, said second valve mechanism housing a thermal material which expands upon being heated to a temperature at or above a third activation temperature different from the first and second activation temperatures, and contracts upon being cooled below said third activation temperature, the first and second valve mechanisms sharing one of said first and second pistons.

In an embodiment, a third valve mechanism is arranged in series and in combination with said first and second valve mechanisms, said third valve mechanism housing a thermal material which expands upon being heated to a temperature at or above a fourth activation temperature different from the first, second and third activation temperatures, and contracts upon being cooled below said fourth activation temperature, the third valve mechanism sharing the other of said first and second pistons with said first valve mechanism.

In an embodiment, said first piston is adapted to extend along said central axis in a first direction with respect to said first valve mechanism in response to said first thermal material being heated to a temperature at or above the first activation temperature and to retract upon being cooled below said first activation temperature, movement of said first piston causing said second valve mechanism to be disposed along said central axis in said first direction; said first piston is adapted to extend along said central axis in a second direction opposite to said first direction with respect to said second valve mechanism in response to said thermal material in said second valve mechanism being heated to a temperature at or above the third activation temperature, movement of said first piston in said second direction causing said second valve mechanism to be further disposed along said central axis in said first direction; said second piston is adapted to extend along said central axis in said second direction in response to said second thermal material being heated to a temperature at or above the second activation temperature, movement of said second piston in said second direction causing said first and second valve mechanisms to be disposed along said central axis in said first direction; and said second piston is adapted to extend along said central axis in said first direction in response to said thermal material in said third valve mechanism being heated to a temperature at or above the fourth activation temperature, movement of said second piston in said first direction causing said first and second valve mechanisms to be further disposed along said central axis in said first direction.

In an embodiment, a return spring is mounted within said valve chamber for biasing said valve member to return to a first or neutral position relating to said first operational state.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Reference will now be made in detail to exemplary implementations of the technology. The example embodiments are provided by way of explanation of the technology only and not as a limitation of the technology. It will be apparent to those skilled in the art that various modifications and variations can be made in the present technology. Thus, it is intended that the present technology cover such modifications and variations that come within the scope of the present technology.

Figure 1:
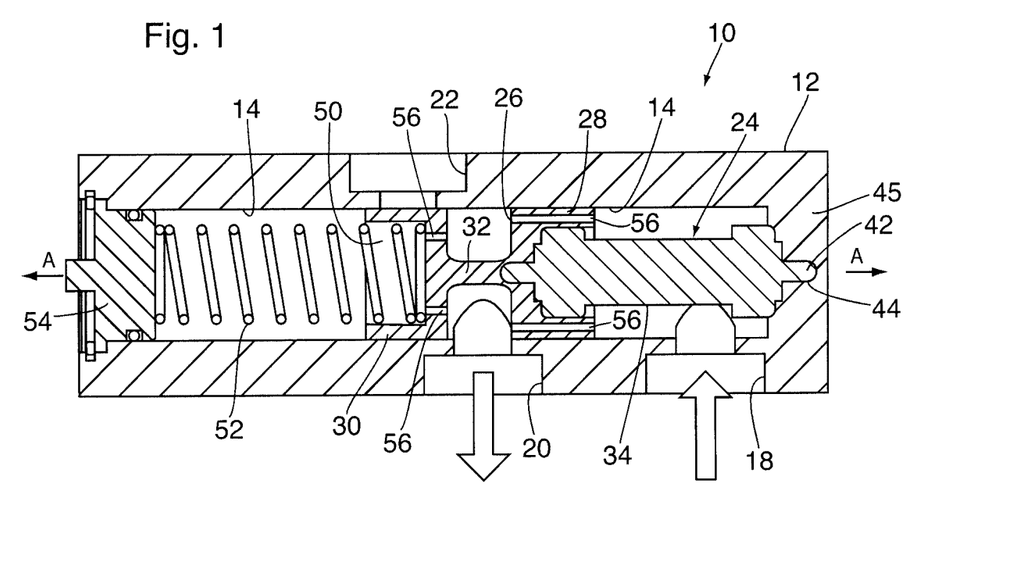
FIG. 1 is a schematic cross-sectional view of an example embodiment of a by-pass valve according to the present disclosure in a first operational state.
Figure 2:
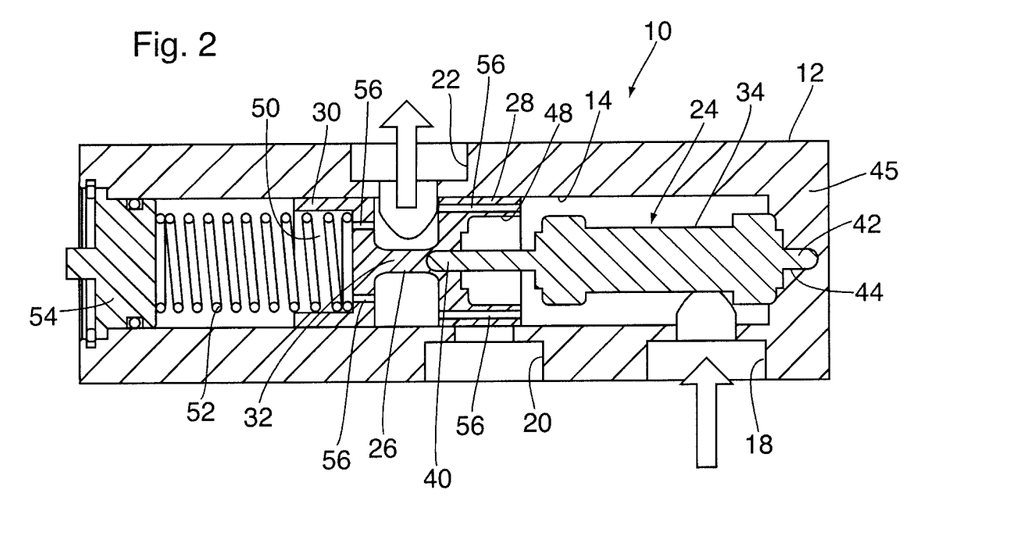
FIG. 2 is a schematic cross-sectional view of the by-pass valve of FIG. 1 in a second operational state.
Figure 3:
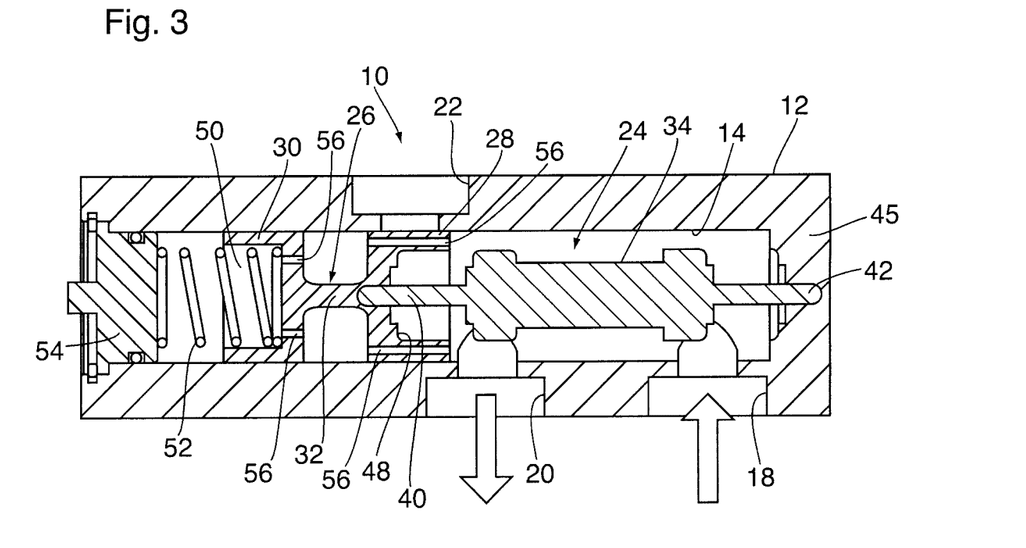
FIG. 3 is a cross-sectional view of the by-pass valve of FIG. 1 in a third operational state.

Referring now to FIGS. 1-3 there is shown an exemplary embodiment of a by-pass valve 10 according to the present disclosure. In the subject exemplary embodiment, by-pass valve 10 is intended to be fluidly connected to at least one heat exchanger and may serve to either direct fluid from a fluid source to the at least one heat exchanger for warming or cooling, depending upon the particular operating conditions, or direct the fluid elsewhere in the overall heat exchanger circuit so as to by-pass the heat exchanger under certain operating conditions.

By-pass valve 10 has a main body 12 defining a central longitudinal axis A, also referred to herein as the "central axis" or the "axis". The main body 12, which is also referred to herein as the "housing" or "valve housing", has a main bore 14 formed therein that extends from an open, first end of the main body 12 to a closed, second end of the main body 12. The main bore 14 defines a valve chamber within the main body 12, and is referred to in the following discussion as "valve chamber 14". An inlet port 18, also referred to herein as the "fluid inlet" is formed in the main body 12 and extends so as to be in fluid communication with the main bore 14. A first outlet port 20, also referred to herein as the "first fluid outlet", is formed in the main body 12 downstream from the inlet port 18 and extends into the main body 12 so as to be in fluid communication with the main bore 14. A second outlet port 22, also referred to herein as the "second fluid outlet", is arranged downstream from both the inlet port 18 and the first outlet port 20 and is formed in the main body 12 so as to be in fluid communication with the main bore 14.

At least one temperature responsive valve actuator or valve mechanism 24 is arranged inside the main bore 14 and is operably coupled to a valve spool 26 (also referred to herein as "valve member 26") that is also arranged within the main bore 14. The valve spool 26 has first and second ends 28, 30 each having an outer diameter that corresponds to the diameter of the valve chamber 14 formed within the main body 12. An intermediate portion 32 extends between and interconnects the first and second ends 28, 30 of the valve spool 26, the intermediate portion 32 having an outer diameter that is smaller than the diameter of the main bore 14. The first end 28 of valve spool 26 is located proximate to the fluid inlet 18 and is located upstream of the second end 30.

Figure 4:
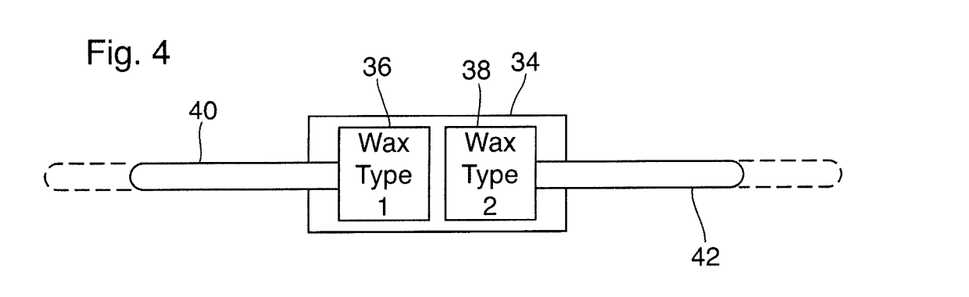
FIG. 4 is a schematic cross-sectional view of a valve mechanism incorporated into the by-pass valve of FIG. 1.

The valve mechanism 24 is sometimes referred to as a thermal motor and is generally in the form of a piston-cylinder arrangement. Referring now to FIG. 4 there is shown a schematic illustration of valve mechanism 24. In the subject embodiment, the valve mechanism 24 is comprised of a cylinder 34 (also referred to herein as the "outer housing") which is located in close proximity to fluid inlet 18. The cylinder 34 has two separate chambers 36, 38 formed therein, each chamber 36, 38 housing a different thermal material, such as a wax, capable of expanding/contracting in response to temperature changes associated with the fluid coming into contact with the valve mechanism 24. A first piston 40 is arranged at one end of the cylinder 34 and is slidable with respect to cylinder 34, the first piston 40 being operably coupled to the thermal material housed within the first chamber 36 formed in the cylinder 34. A second piston 42 is arranged at the opposed end of the cylinder 34 and is also slidable with respect the cylinder 34, the second piston 42 being operably coupled to the thermal material housed within the second chamber 38 formed in the cylinder 34.

When the valve mechanism 24 is arranged within the valve chamber 14 within the main body 12, the second piston 42 is arranged so as to abut against or be received within a corresponding recess 44 formed in the end wall 45 of the valve chamber 14, proximate to the fluid inlet 18. The valve spool 26 is then arranged within the valve chamber 14 so that the first end 28 of the valve spool 26 engages and abuts against the first piston 40 of the valve mechanism 24. Accordingly, the first end 28 of the valve spool 26 may be formed with a corresponding recess 48 (FIG. 2) for receiving an end of the valve mechanism 24. The second end 30 of the valve spool 26 may also be formed with a recess 50 for receiving an end of a return spring 52 that is arranged within the valve chamber 14, one end of which abuts against the second end 30 of the valve spool 26 while the other end abuts against a valve closure cap 54 that is arranged within the open end of the main body 12 to fluidly seal the valve chamber 14. The return spring 52 serves to urge or bias the valve mechanism 24 back to its first or neutral position when the thermal sensitive material returns to its original state.

At least one first flow-through opening 56 is formed in and extends through the first end 28 of the valve spool 26 parallel to the central axis A, the at least one first flow-through opening 56 providing fluid communication between the fluid inlet 18 and the intermediate portion 32 of the valve spool 26. In the illustrated embodiments a plurality of first flow-through openings 56 are provided in the first end 28 allow fluid to pass through the body of the first end 28 of the valve spool 26 to allow for proper functioning of the bypass valve 10 as will be described in further detail below.

At least one second flow-through opening 56 is also formed in and extends through the second end 30 of the valve spool 26 parallel to the central axis A. In the illustrated embodiments a plurality of second flow-through openings 56 are provided in the second end 30 allow fluid to pass through the body of the first end 30 of the valve spool 26 into the compartment in which the return spring 52 is housed, to equalize fluid pressure throughout the valve chamber 14 and allow for proper functioning of the bypass valve 10. Because the second end 30 of spool 26 has recess 50 which is open to the compartment housing return spring 52, the flow-through passages 56 in the second end 30 of spool 26 are only required to pass through the bottom wall of the second end 30, thereby providing fluid communication between the intermediate portion 32 of valve spool 26 and the inside of recess 50.

In operation, when the bypass valve 10 is mounted within a fluid circuit within an automobile system for example, a control fluid enters the valve 10 through fluid inlet port 18. In its first operational or neutral state, the temperature of the control fluid entering the valve 10 is within a first predetermined range and the valve mechanism 24 has both its first and second pistons 40, 42 in their first or neutral positions housed primarily within cylinder 34 with the valve spool 26, therefore, at its most right hand position within the valve chamber 14 with the second end 30 of the valve spool 26 blocking the second outlet port 22. The configuration of the temperature responsive valve mechanism 24 illustrated in FIG. 1 is provided at fluid temperatures below a first activation temperature and/or within the first predetermined temperature range, and is sometimes referred to herein as the "neutral position".

With valve mechanism 24 in the neutral position, control fluid entering the main bore 14 through inlet port 18 flows through the flow-through openings 56 formed in the first end 28 of the valve spool 26 to the first outlet port 20 as illustrated by the flow directional arrows included in FIG. 1. This may be considered a first operational state or cold state of the valve 10 where the control fluid is at a temperature that is below both of the activation temperatures of the valve mechanism 24.

As the temperature of the control fluid entering the valve 10 increases to within a second predetermined range, the fluid entering the inlet port 18 activates one of the thermal materials housed within the cylinder 34. In the subject example embodiment, the thermal material housed in the first chamber 36 has the lower activation temperature and begins to activate and expand causing the first piston 40 to be pushed out of the cylinder 34, which in turn moves the valve spool 26 to the left. The configuration of the temperature responsive valve mechanism 24 illustrated in FIG. 2 is provided at fluid temperatures at or above a first activation temperature and/or within the second predetermined temperature range, and is sometimes referred to herein as the "first operable position".

As the valve spool 26 moves to the left to the first operable position of valve mechanism 24, the first end 28 of the valve spool 26 blocks or closes the first outlet port 20 and opens the second outlet port 22 as the second end 30 of the valve spool 26 is moved out of its previous position blocking the second outlet port 22. Accordingly, fluid entering the valve 10 flows around the valve mechanism 24, through the flow-through openings 56 formed in the first end 28 of the valve spool 26 where it then exits the valve 10 through the second outlet port 22. This second operational state of the by-pass valve 10 illustrated in FIG. 2 may be considered as a warm state where the temperature of the control fluid is below one of the activation temperatures of the valve mechanism 24 and, in the present embodiment, the temperature of the control fluid is at or above the first activation temperature and below the second activation temperature.

As the temperature of the control fluid increases to within a third predetermined range, the fluid entering the valve chamber 14 through fluid inlet port 18 begins to activate the second of the two thermal materials housed within the cylinder 34. Accordingly, the thermal material housed in the second chamber 38 expands, causing the second piston 42 to be pushed out of the cylinder 34, the second piston 42 acting against the end wall 45 of the main body 12, which causes the valve spool 26 to be moved farther to the left. The configuration of the temperature responsive valve mechanism 24 illustrated in FIG. 3 is provided at fluid temperatures at or above a second activation temperature and/or within the third predetermined temperature range, and is sometimes referred to herein as the "second operable position".

As the valve spool 26 moves farther to the left to the second operable position, the first end 28 of the valve spool 26 is brought into position blocking the second fluid outlet 22, and effectively re-opening the first fluid outlet 20. This third operational state of the by-pass valve 10 is illustrated in FIG. 3 and may be considered as a hot state where the temperature of the control fluid is above the first activation temperature and at or above the second activation temperature of the valve mechanism 24.

Figure 13A:
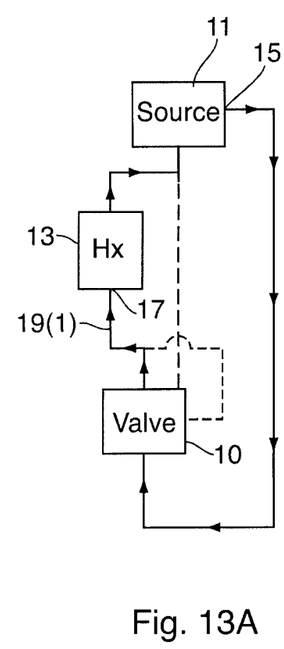
FIGS. 13A-13C are schematic system diagrams illustrating three operational states of the by-pass valve of FIGS. 1-3 incorporated into an automobile system fluid circuit.
Figure 13B:
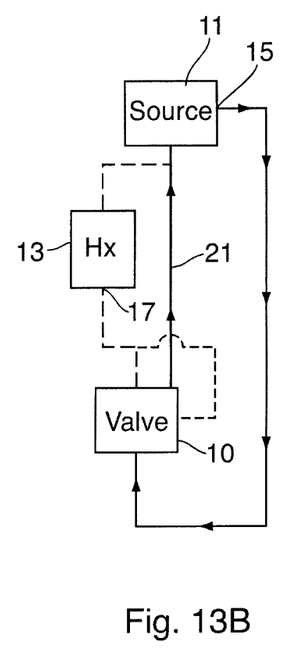
Figure 13C:
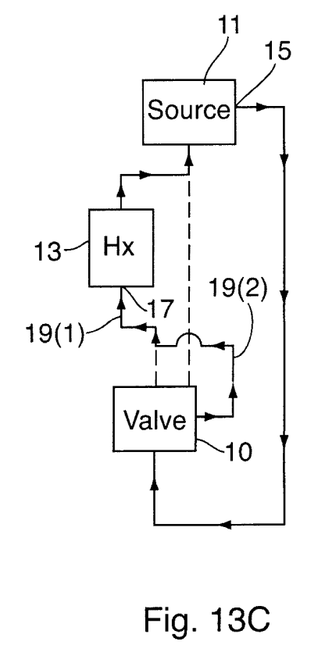

In the case of an automobile, for example, it may be beneficial to direct a system fluid (such as engine oil, transmission fluid, axle oil, exhaust gas, etc.) to a heat exchanger for warming and/or cooling depending on the particular temperature of the fluid during operation of the vehicle and to by-pass the heat exchanger at other operating conditions so as to avoid pressure losses in the overall system when the warming and/or cooling function of the heat exchanger is not required. At cold start conditions, for example, a number of fluids may require warming in order to bring the temperature of the fluid to its optimal operating temperature as quickly as possible. In such circumstances, thermal by-pass valve 10 can be incorporated into the automobile system at a location intermediate the fluid source 11 (e.g. the engine, transmission, etc.) and a corresponding heat exchanger 13 (e.g. engine oil cooler (EOC), transmission oil cooler (TOC), exhaust gas heat recovery (EGHR), etc.). A schematic diagram illustrating how the by-pass valve 10 may be incorporated into a heat exchange circuit within an automobile system is shown, for instance, in FIGS. 13A-13C which illustrate the three operational states of the by-pass valve 10 as described above. As shown, the by-pass valve 10 is arranged intermediate a fluid source 11 and a heat exchanger 13 with the by-pass valve 10 being fluidly coupled to a fluid outlet 15 on the fluid source and a fluid inlet 17 on the corresponding heat exchanger 13 and functions so as to direct the fluid exiting the fluid source 11 to the heat exchanger 13 for warming via fluid line 19(1) when the temperature of the control fluid is within the first predetermined range or in the cold state (e.g. when by-pass valve 10 is in its first neutral position described above in connection with FIG. 1), as shown in FIG. 13A and as described in connection with FIG. 1. As shown in FIG. 13B, the by-pass valve 10 functions to direct the fluid back to the fluid source 11 via return line 21, effectively by-passing the heat exchanger 13 when the temperature is within the second predetermined range or warm state as described in connection with FIG. 2. As shown in FIG. 13C, the by-pass valve 10 functions to direct the fluid back to the heat exchanger 13 via fluid lines 19(2), 19(1) when the temperature of the fluid is outside the optimal operating temperature range and requires cooling such as when the valve is in its third operational state or hot state as described in connection with FIG. 3.

Figure 14A:
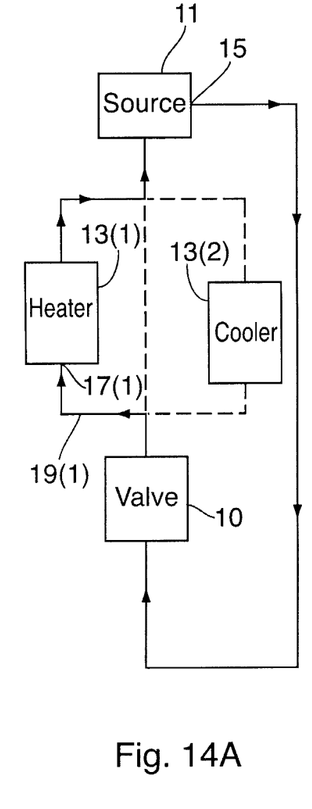
FIGS. 14A-14C are schematic system diagrams illustrating three operational states of the by-pass valve of FIGS. 1-3 incorporated into an alternate automobile system fluid circuit.
Figure 14B:
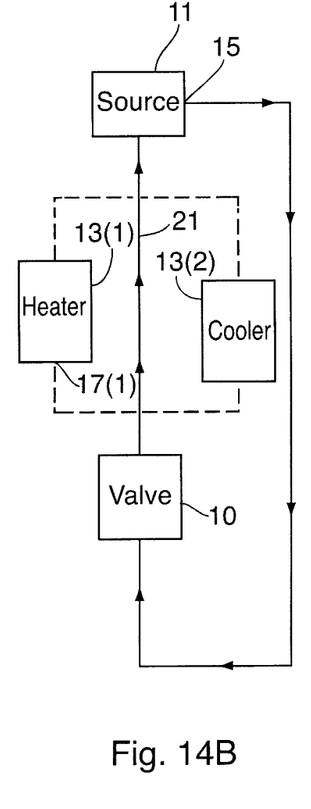
Figure 14C:
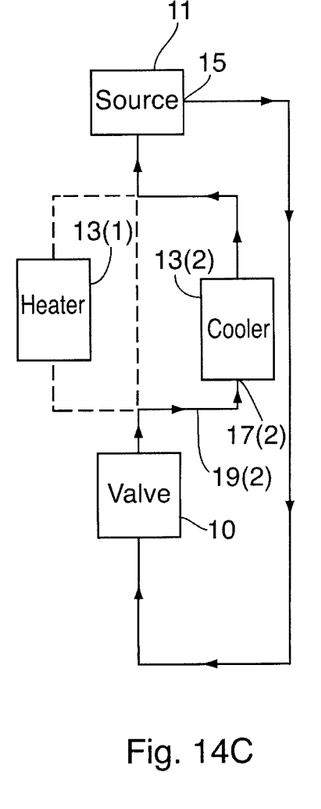

Referring now to FIGS. 14A-14C another system arrangement is shown illustrating how by-pass valve 10 may be incorporated into an automobile system. In this arrangement, the by-pass valve 10 is arranged intermediate a fluid source 11 and two separate heat exchangers 13(1), 13(2) wherein the first heat exchanger 13(1) functions as a heater while the second heat exchanger 13(2) functions as a cooler. Accordingly, when the temperature of the control fluid exiting the fluid source 11 is cold or below both of the activation temperatures associated with the valve mechanism 24, the by-pass valve 10 is in its cold or first operational state (as illustrated in FIG. 1) where fluid entering the by-pass valve 10 is directed through the first outlet port 20 to the first heat exchanger 13(1) for heating via fluid line 19(1) before being returned to the fluid source 11. When the temperature of the control fluid moves to a temperature above the first activation temperature associated with the valve mechanism 24, the by-pass valve 10 moves into its warm or second operational state (illustrated in FIG. 2) where fluid entering the by-pass valve 10 is directed through the second outlet port 22 where it may be returned directly to the fluid source 11 via return line 21 effectively by-passing the first and/or second heat exchanger 13(1), 13(2) as illustrated schematically in FIG. 14B. When the temperature of the control fluid further increases to a temperature above both of the activation temperatures associated with the valve mechanism 24, the by-pass valve 10 moves into its hot or third operational state (illustrated in FIG. 3) where the fluid entering the valve 10 is directed through the first outlet port 20 to the second heat exchanger 13(2) via fluid line 19(2) as illustrated schematically in FIG. 14C.

Accordingly, the by-pass valve 10 described above in connection with FIGS. 1-4 provides a multi-stage valve having a relatively simple overall construction and employs a single valve mechanism 24, the valve mechanism 24 having multiple activation temperatures as a result of the multiple chambers 36, 38 filled with different thermal materials that are formed in and housed within the cylinder 34 forming the valve mechanism 24.

Figure 10:
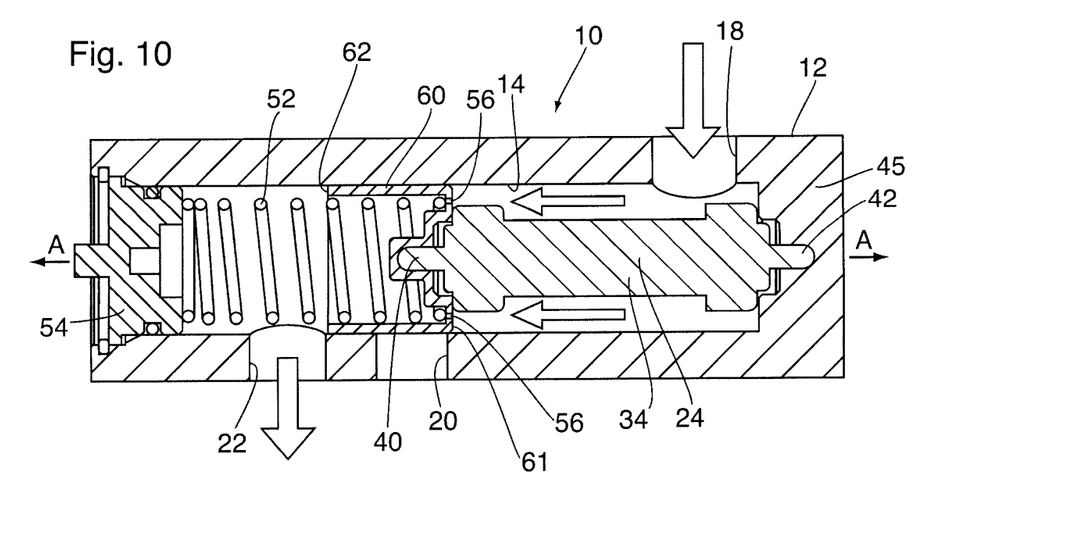
FIG. 10 is a schematic cross-sectional view of another example embodiment of a by-pass valve according to the present disclosure in a first operational state.
Figure 11:
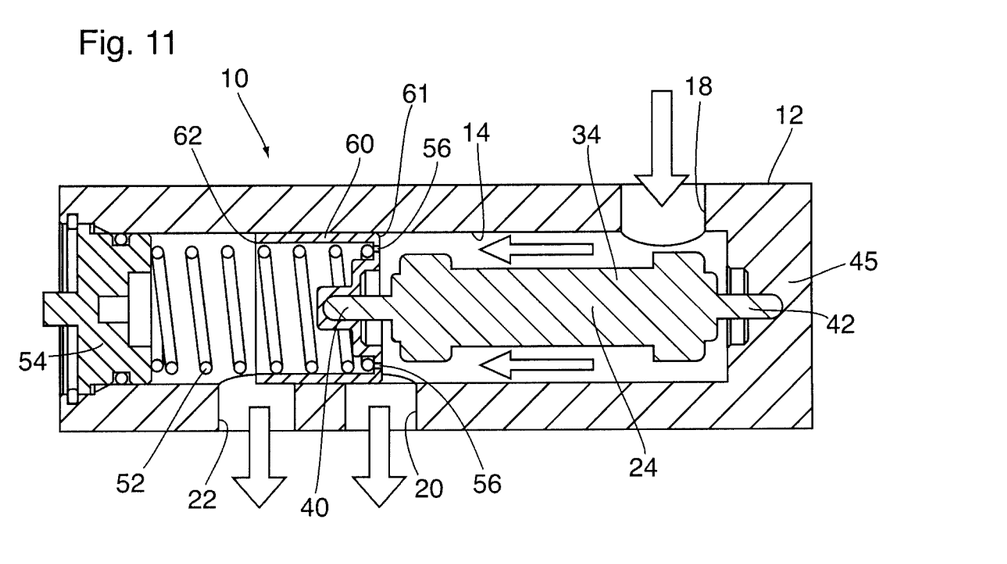
FIG. 11 is a schematic cross-sectional view of the by-pass valve of FIG. 10 in a second operational state.
Figure 12:
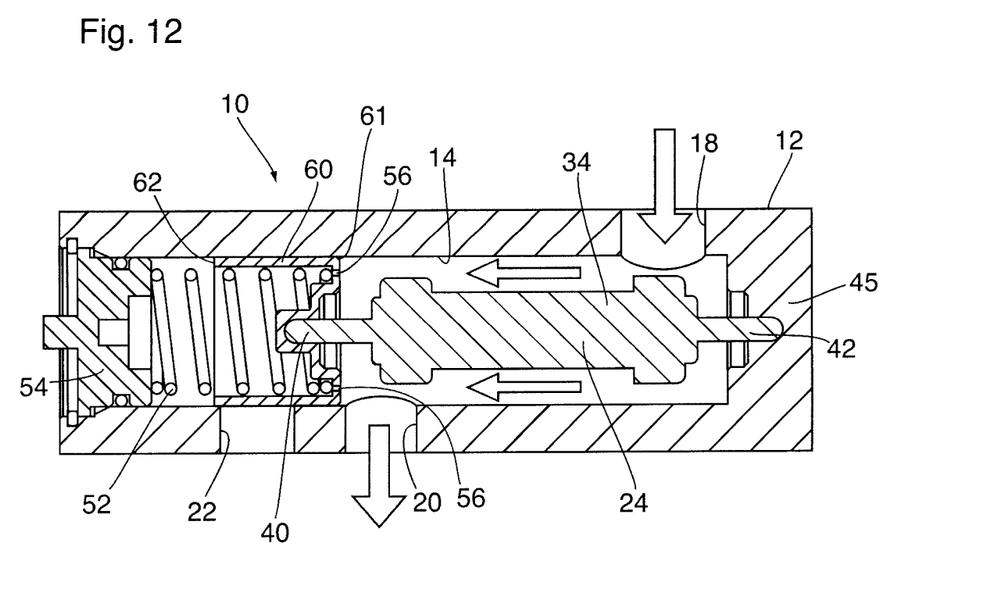
FIG. 12 is a schematic cross-sectional view of the by-pass valve of FIG. 10 in a third operational state.

Referring now to FIGS. 10-12 there is shown another exemplary embodiment of a by-pass valve 10 according to the present disclosure, wherein similar reference numerals have been used to identify similar components.

In the subject embodiment, the by-pass valve 10 is similar to the embodiment described above in connection with FIGS. 1-4, wherein valve mechanism 24 is arranged within the valve chamber 14 of the main body 12. Rather than having a valve spool 26 having two end portions 28, 30 spaced apart and interconnected by an intermediate portion 32 having a reduced diameter as compared to the end portions 28, 30, arranged so as to abut against the first piston 40 of the valve mechanism for controlling the flow to either the first or second fluid outlet port 20, 22, a singular valve sleeve 60 is used for controlling the flow to the first and second outlet ports 20, 22. The valve sleeve 60 has a generally cylindrical structure with a first end 61 being formed so as to receive the first piston 40 and a corresponding first end of the valve mechanism 24 so that the valve sleeve 60 moves with piston 40 and valve mechanism 24. The first end 61 has at least one flow-through opening 56 formed therein, allowing fluid to pass through the first end 61 of the valve sleeve 60. In the illustrated embodiment, the first end 61 is in the form of a cage-like structure having a plurality of flow-through openings 56 formed therein. The second end 62 of the valve sleeve 60 is an open end adapted for receiving an end of the return spring 52. The outer diameter of the valve sleeve 60 is sized so as to correspond to the inner diameter of the valve chamber 14, the valve sleeve 60 being slidable along the main bore 14 within the main body 12 of the valve 10.

An inlet port 18 is formed in the main body 12 and extends through to the main bore 14 so as to be in fluid communication with the valve chamber 14. A first outlet port 20 is formed in the main body 12 downstream from and, in the subject embodiment, on the opposite side of the main body 12 as the inlet port 18, the first outlet port 20 extending into the main body 12 so as to be in fluid communication with the main bore 14. A second outlet port 22 is formed downstream from and adjacent to the first outlet port 20, the second outlet port 22 extending into the main body 12 so as to be in fluid communication with the valve chamber 14.

In operation, when the by-pass valve 10 is in its first operational state as illustrated in FIG. 10, the control fluid enters the valve 10 through fluid inlet port 18 where it comes into contact with the valve mechanism 24. When the temperature of the control fluid entering the valve 10 is within a first predetermined range that is below both of the activation temperatures of the two, separate thermal materials housed within the cylinder 34 of the valve mechanism 24, the valve 10 remains in its first, neutral position with the valve sleeve 60 arranged in its most right hand position within the valve sleeve 60 up against the corresponding first end of the valve mechanism 24 with the first piston 40 being in its fully retracted position, the valve sleeve 60 effectively blocking or sealing the first outlet port 20. Accordingly, the control fluid entering the valve 10 flows through the valve chamber 14 surrounding the valve mechanism 24, through the flow-through openings 56 provided in the first end 61 of the valve sleeve 60 and out through the second fluid outlet 22.

As the temperature of the control fluid entering the valve 10 increases to within a second predetermined range, which corresponds to the activation temperatures of one of the two, separate thermal materials housed within the valve mechanism 24, the thermal material with the lower activation temperature begins to expand causing the first piston 40 (in the illustrated example embodiment) to be pushed out of the cylinder 34 thereby moving the valve sleeve 60 to the left partially opening the first fluid outlet port 20 and partially closing the second fluid outlet port 22. Therefore, when the valve 10 is in its second operational state, as illustrated in FIG. 11, the control fluid flowing through the valve 10 is directed to both the first and second fluid outlet ports 20, 22.

As the temperature of the control fluid entering the valve 10 increases even further to a temperature within a third predetermined range that corresponds to the activation temperature of the second thermal material housed within the valve mechanism 24, the second thermal material begins to expand causing the second piston 42 to be pushed out of the cylinder 34. As the second piston 42 acts against the end wall 45 of the main body 12, the cylinder 34 itself is moved to the left, which in turn moves the valve sleeve 60 further to the left, fully opening the first outlet port 20 and closing or blocking the second outlet port 22 as illustrated in FIG. 12. Accordingly, in the third operational state of the valve 10, the control fluid entering the valve 10 is directed entirely to the first outlet port 20.

Figure 15A:
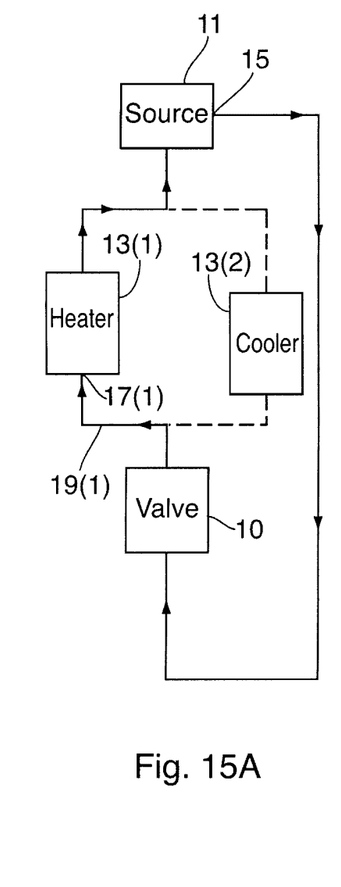
FIGS. 15A-15C are schematic system diagrams illustrating three operational states of the by-pass of FIGS. 10-12 incorporated into an automobile system fluid circuit.
Figures 15B, 15C:
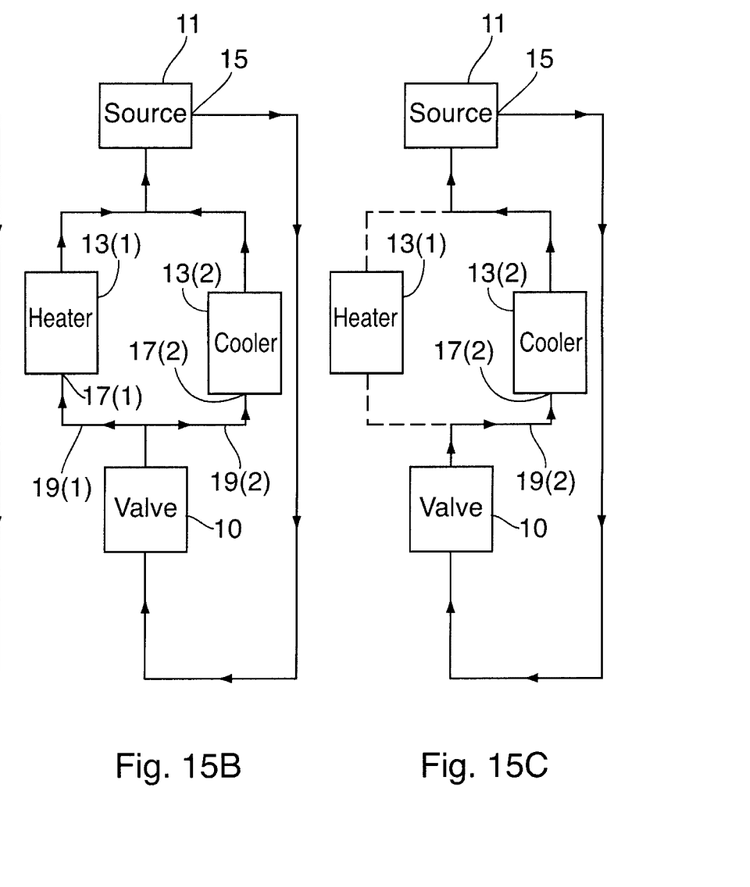

In the case of an automobile, a by-pass valve 10 providing the multi-stage actuation as described above in connection with FIGS. 10-12 may be beneficial in instances where a control fluid is required to be shared for two separate uses during a particular operational stage. For instance, at cold start conditions, it may be desirable to direct the control fluid to a heat exchanger or heater to assist with warming of the fluid in order to bring it up to its preferred operating temperature. As the temperature of the control fluid is warmed, once it reaches a predetermined temperature it may be desirable to direct the control to both the heater and second heat exchanger or cooler to provide a boost to cabin or passenger compartment warm-up while preventing a possible over-heating condition by directing some of the control fluid to the cooler. Once the temperature of the control fluid has further increased and assistance with cabin warm-up is no longer required the fluid can be directed solely to the cooler in the third operational stage of the valve 10. Accordingly, the by-pass valve 10 as illustrated in FIG. 10-12 could be incorporated into the automobile system at a location intermediate the fluid source 11 and two separate heat exchangers 13(1), 13(2) as shown, for instance, in FIGS. 15A-15C. Therefore, during the first operational stage of the by-pass valve 10 illustrated in FIG. 15A, all of the control fluid is directed to the first heat exchanger or heater 13(1) to assist with warm-up at cold start conditions. In the second operational stage of the by-pass valve 10, as illustrated in FIG. 15B, the control fluid is directed to both the heater 13(1) and the second heat exchanger or cooler 13(2). FIG. 15C illustrates the third operational stage of the by-pass valve 10 where the control fluid is directed to the second heat exchanger 13(2) for cooling once the temperature of the control fluid is within the third predetermined range.

Referring now to FIGS. 5-9 there is shown another exemplary embodiment of a by-pass valve 10 according to the present disclosure, wherein similar reference numerals have been used to identify similar components.

In the subject embodiment, the by-pass valve 10 is similar to the embodiment described above in connection with FIGS. 1-4, wherein a valve spool 26 is used for controlling the flow to either the first or second outlet ports 20, 22. However, in the subject embodiment, rather than a single valve mechanism 24 arranged within the valve chamber 14 formed in the main body 12, a valve mechanism 24 is arranged in combination with two additional valve mechanisms 70, 72. As in the previously described embodiments, valve mechanism 24 is comprised of cylinder 34 having two separate chambers 36, 38 formed therein for housing two separate thermal materials each having a different activation temperature. First and second pistons 40, 42 are arranged within the cylinder 34 and slidable with respect thereto as illustrated, for example in FIG. 4. Valve mechanisms 70, 72 are similar in structure in that they, too, comprise a cylinder 74, 76 however, in this instance the cylinders 74, 76 each house a single thermal material. As well, valve mechanisms 70, 72 are arranged one at either end of the central valve mechanism 24, and are adapted to share the first and second pistons 40, 42 with the centrally arranged valve mechanism 24, respectively. Accordingly, when the valve mechanisms 70 are arranged in series with the central valve mechanism 24, the first piston 40 extends partially into cylinder 34 operably coupled to the thermal material housed in the first chamber 36 and partially into cylinder 74 where it is operably coupled to the thermal material housed within valve mechanism 70. The second piston 42 of the central valve mechanism 24 extends partially into cylinder 34 where it is operably coupled to the thermal material housed within the second chamber 38 and also extends partially into the cylinder 76 of valve mechanism 72 where it is operably coupled to the thermal material housed therein. While in the subject exemplary embodiment valve mechanisms 70, 72 share the first and second pistons 40, 42 of the central valve mechanism 24 it will be understood that other arrangements are possible, where valve mechanisms 70, 72 have separate pistons that simply abut and act against the first and second pistons 40, 42 associated with valve mechanism 24.

Figure 5:
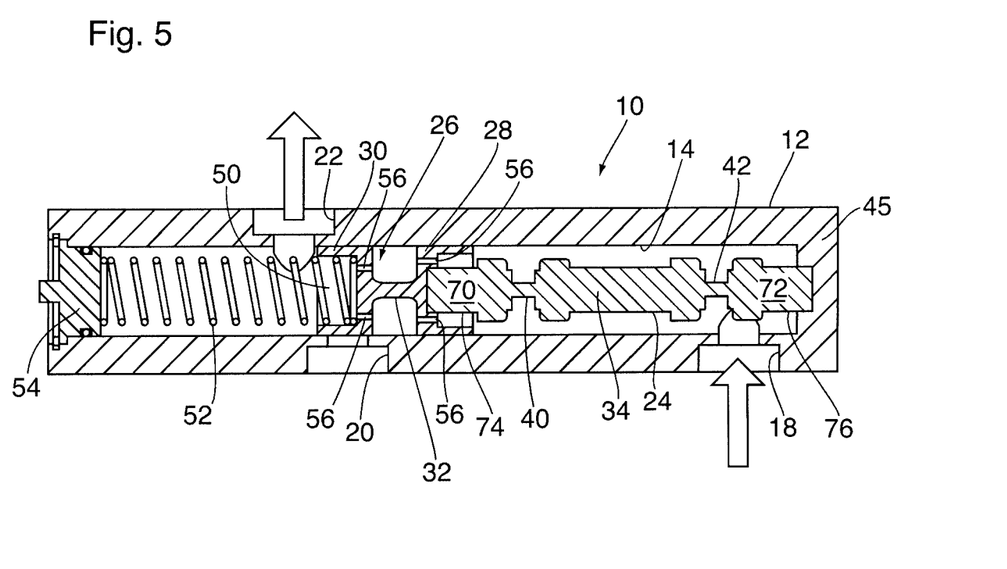
FIG. 5 is a schematic cross-sectional view of another example embodiment of a by-pass valve according to the present disclosure in a first operational state.

Valve mechanisms 24, 70, 72 are selected so that each of the thermal materials housed therein offer different activation temperatures which results in a multi-stage actuation of the by-pass valve 10. For instance, in a first operational state, as illustrated in FIG. 5, all of the valve mechanisms 24, 70, 72 are in their first or neutral positions with the pistons 40, 42 being in their retracted positions with respect to cylinder 34 of valve mechanism 24 as well as cylinders 74, 76 of valve mechanisms 70, 72. In this position, the valve spool 26 is in its most right-hand position within the main bore 14 with the second end 30 of the valve spool 26 blocking or closing the first fluid outlet port 20. Accordingly, when the control fluid entering the valve 10 through inlet port 18 is at a temperature within a first predetermined range that is below the activation temperatures of all of the various thermal materials housed within the valve mechanisms 24, 70, 72, the control fluid flows over the valve mechanisms 24, 70, 72 through the flow-through openings or ports 56 formed in the first and second ends 28, 30 of the valve spool 26 and out through the second outlet port 22.

Figure 6:
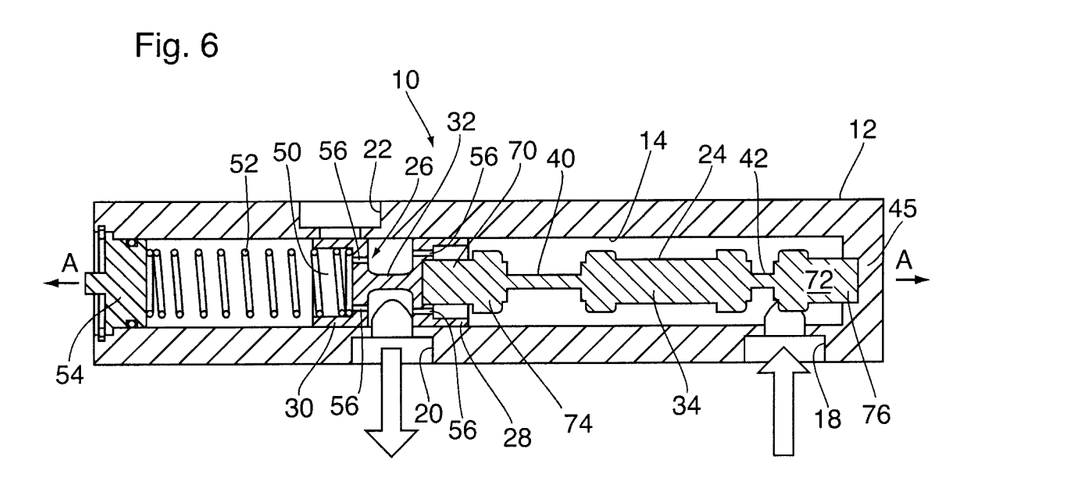
FIG. 6 is a schematic cross-sectional view of the by-pass valve of FIG. 5 in a second operational state.

As the temperature of the control fluid increases to within a second predetermined range, the thermal material with the lowest activation temperature, such as the thermal material housed within valve mechanism 70 begins to expand causing the piston 40 to be pushed out of the cylinder 74, piston 40 acting against valve mechanism 24 (that remains stationary), thereby causing the cylinder 74 to move towards the left which in turn pushes the valve spool 26 to the left by a distance that brings the second end 30 of the valve spool 26 into position blocking or closing the second outlet port 22, thereby opening the first outlet port 20. Therefore, in the second operational state of the by-pass valve 10 as illustrated in FIG. 6, the control fluid enters the valve 10 through inlet port 18 and flows out of the valve 10 through first outlet port 20.

Figure 7:
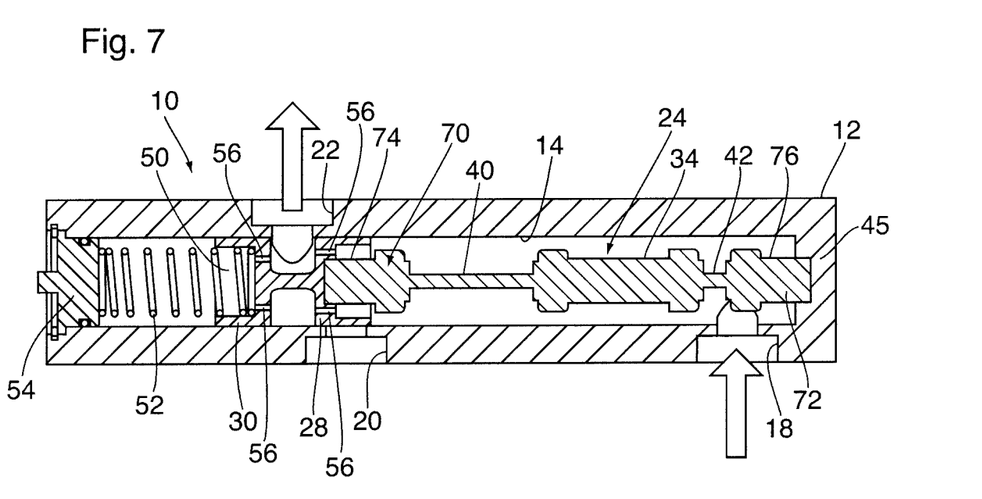
FIG. 7 is a cross-sectional view of the by-pass valve of FIG. 5 in a third operational state.

As the temperature of the control fluid increases to within a third predetermined temperature range, the thermal material with the next lowest activation temperature, such as the thermal material housed within the first chamber 36 of valve mechanism 24 begins to activate causing the portion of the first piston 40 that was positioned within cylinder 34 to be pushed out of the cylinder 34 which, in turn, causes valve mechanism 70 to be pushed farther to the left along with valve spool 26. By moving the valve spool 26 farther to the left, the first end 28 of the valve spool 26 is brought into position blocking or closing the first fluid outlet 20 while the second end 30 of the valve spool 26 is moved out of its position blocking the second outlet port thereby opening the second fluid outlet 22. Accordingly, in the third operational state of the valve 10 as illustrated in FIG. 7, the incoming control fluid is directed through the main bore 14 and flow through openings 56 formed in the valve spool 26 where it exits the valve 10 through the second fluid outlet 22.

Figure 8:
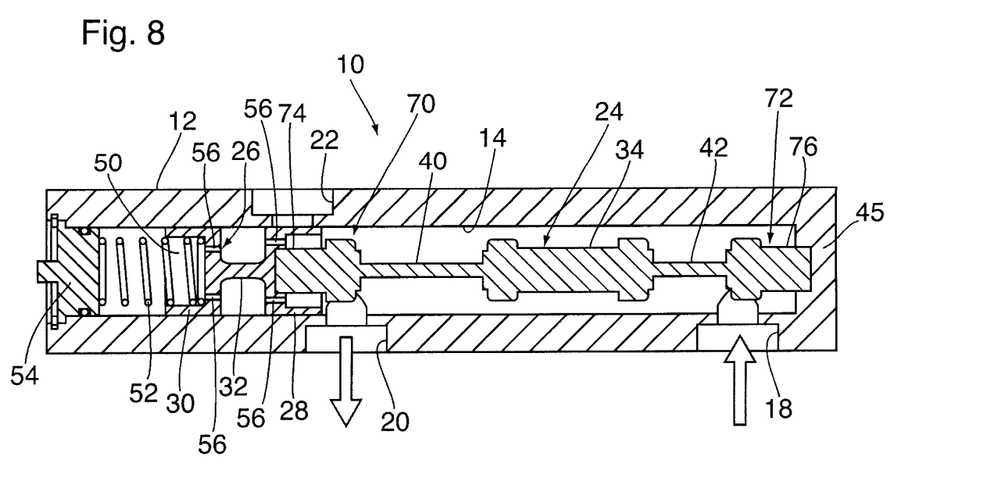
FIG. 8 is a cross-sectional view of the by-pass valve of FIG. 5 in a fourth operational state.

As the temperature of the control fluid increases to within a fourth predetermined temperature range, the thermal material with the next lowest activation temperature, such as the thermal material housed within the second chamber 38 of valve mechanism 24, is activated causing the second piston 42 to be pushed out of cylinder 34. As piston 42 acts against valve mechanism 72, which is stationary in its position against the end wall 45 of the main body 12, cylinder 34 is moved towards the left, which in turn causes valve mechanism 70 and valve spool 26 to move farther to the left as well in a chain-type reaction. Movement of the valve spool 26 farther to the left brings the first end 28 of the valve spool 26 into position blocking the second fluid outlet 22 while opening the first fluid outlet 20. Accordingly, in the fourth operational state of the valve as illustrated in FIG. 8, the incoming control fluid is directed through the main bore 14 and out through the first outlet 20.

Figure 9:
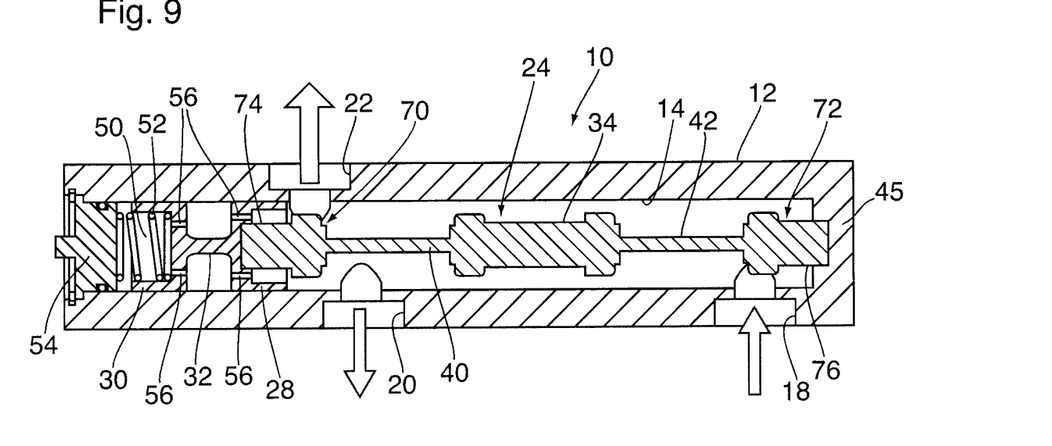
FIG. 9 is a cross-sectional view of the by-pass valve of FIG. 5 in a fifth operational state.

As the temperature of the control fluid increases to within a fifth predetermined temperature range, the thermal material with the highest activation temperature, such as the thermal material housed within valve mechanism 72, begins to expand causing the portion of the second piston 42 housed within cylinder 76 to be pushed out of the cylinder 76, moving valve mechanism 24 and valve mechanism 70 together with valve spool 26 even farther to the left. Movement of the valve spool 26 to the left moves the first end 28 of the valve spool out of position blocking or closing the second fluid outlet 22, resulting in both the first and second fluid ports 20, 22 being opened. Accordingly, in the fifth operational state of the valve 10, as illustrated in FIG. 9, the incoming control fluid is directed through the main body 12 of the valve 10 and out through both the first and second fluid outlet ports 20, 22.

By arranging various valve mechanisms 24, 70, 72 in combination within a single valve body 12 where each valve mechanism has one or more different activation temperatures, various operational states can be achieved using a single thermal by-pass valve 10 allowing for various flow arrangements associated with different temperature ranges of the incoming control fluid.

While various exemplary embodiments have been described, it will be understood that certain adaptations and modifications of the described embodiments can be made. Therefore, the above discussed embodiments are considered to be illustrative and not restrictive.

What is claimed is:

1. A by-pass valve for controlling flow of a control fluid, comprising:
    a housing defining a valve chamber therein having a central axis;
    a fluid inlet in fluid communication with said valve chamber;
    a first fluid outlet arranged downstream from said fluid inlet along said central axis, the first fluid outlet being in fluid communication with said valve chamber;
    a second fluid outlet arranged downstream from said first fluid outlet along said central axis, the second fluid outlet being in fluid communication with said valve chamber;
    at least one temperature responsive valve mechanism arranged within said valve chamber for controlling flow of the control fluid to said first and second fluid outlets, the at least one temperature responsive valve mechanism configured to generate displacement of a piston in response to a temperature change;
    a valve member operably coupled to said at least one temperature responsive valve mechanism such that the valve member is disposed for displacement relative to the valve chamber along said central axis;
    wherein said at least one temperature responsive valve mechanism is operable between:
    a first operational state, wherein the valve member is disposed within the valve chamber such that one of said first fluid outlet and said second fluid outlet is in fluid communication with said fluid inlet while the other one of said first fluid outlet and said second fluid outlet is fluidly isolated from said fluid inlet;
    a second operational state wherein the valve member is displaced, relative to the valve chamber, along the central axis such that fluid communication between the fluid inlet and the other one of the first fluid outlet and the second fluid outlet is established while the one of the first and second fluid outlets that is in fluid communication with the fluid inlet in the first operational state is fluidly isolated from the fluid inlet; and
    a third operational state, wherein the valve member is further displaced, relative to the valve chamber along the central axis such that fluid communication between the fluid inlet and the one of the first fluid outlet and the second fluid outlet that is in fluid communication with the fluid inlet in the first operational state is re-established, while the other one of the first fluid outlet and the second fluid outlet is fluidly isolated from the fluid inlet;
    wherein:
        the first operational state of the at least one temperature responsive valve mechanism corresponds to a neutral position of the bypass valve wherein the control fluid is at a temperature below a first activation temperature of the bypass valve;
        the second operational state of the at least one temperature responsive valve mechanism is provided at control fluid temperatures at or above the first activation temperature and below a second activation temperature; and the third operational state of the at least one temperature responsive valve mechanism is provided at control fluid temperatures at or above the second activation temperature.

2. The by-pass valve as claimed in claim 1, wherein:
while the by-pass valve is in the second operational state, the at least one temperature responsive valve mechanism is disposed in a first operational position corresponding to a first displacement of the valve member along the central axis; and
while the by-pass valve is in the third operational state, the at least one temperature responsive valve mechanism is disposed in a second operational position corresponding to a second displacement of the valve member along the central axis.

3. The by-pass valve as claimed in claim 1, wherein:
the valve member is configured such that:
in each of the first and third operational states, fluid communication is established between the fluid inlet and the first fluid outlet while the second fluid outlet is closed by the valve member; and
in the second operational state, fluid communication is established between the fluid inlet and the second fluid outlet while the first outlet is closed by the valve member.

4. The by-pass valve as claimed in claim 1, wherein:
said valve chamber defines an internal diameter; and
said valve member is in the form of a valve spool which is slidably arranged within the valve chamber for displacement relative to the valve chamber, the valve spool having a first end and a second end that each have an outer diameter that generally corresponds to the inner diameter of said valve chamber, the first and second ends being spaced apart by an intermediate portion having an outer diameter that is smaller than the outer diameter of each of said first and second ends of the valve spool.

5. The by-pass valve as claimed in claim 4, wherein the second end of the valve spool includes a recess for receiving an end of a return spring that is arranged within the valve chamber.

6. The by-pass valve as claimed in claim 4, wherein at least one first flow-through opening is formed in and extends through the first end of the valve spool parallel to the central axis, the at least one first flow-through opening providing fluid communication between the fluid inlet and a portion of the valve chamber defined between the intermediate portion of the valve spool and the internal diameter of the valve chamber.

7. The by-pass valve as claimed in claim 6, wherein, in each of the first and second operational states, fluid communication between the fluid inlet and one of the first and second fluid outlets is provided through the at least one first flow-through opening of the valve spool, and the portion of the valve chamber defined between the intermediate portion of the valve spool and the internal diameter of the valve chamber, the valve spool being disposed within the valve chamber such that the one of the first and second fluid outlets is aligned with intermediate portion of the valve spool.

8. The by-pass valve as claimed in claim 7, wherein, while the valve member is disposed in the first operational state, the valve spool is disposed within the valve chamber such that the second end of the valve spool is disposed relative to the second fluid outlet such that the second fluid outlet is disposed in a closed position.

9. A by-pass valve for controlling flow of a control fluid, comprising:
a housing defining a valve chamber therein having a central axis;
a fluid inlet in fluid communication with said valve chamber;
a first fluid outlet arranged downstream from said fluid inlet along said central axis, the first fluid outlet being in fluid communication with said valve chamber;
a second fluid outlet arranged downstream from said first fluid outlet along said central axis, the second fluid outlet being in fluid communication with said valve chamber;
at least one temperature responsive valve mechanism arranged within said valve chamber for controlling flow of the control fluid to said first and second fluid outlets, the at least one temperature responsive valve mechanism configured to generate displacement of a piston in response to a temperature change;
a valve member operably coupled to said at least one temperature responsive valve mechanism such that the valve member is disposed for displacement relative to the valve chamber along said central axis;
wherein said at least one temperature responsive valve mechanism is operable between:
a first operational state, wherein the valve member is disposed within the valve chamber such that the first fluid outlet is closed by the valve member, and fluid communication is established between the fluid inlet and the second fluid outlet;
a second operational state wherein the valve member is displaced, relative to the valve chamber, along the central axis such that the fluid inlet is in fluid communication with both the first and second fluid outlets; and
a third operational state, wherein the valve member is further displaced, relative to the valve chamber along the central axis such that fluid communication between the fluid inlet and the first fluid outlet is established while the second fluid outlet is closed by the valve member.

10. The by-pass valve as claimed in claim 9, wherein:
said valve member is a valve sleeve slidably arranged within the valve chamber and operably coupled to said valve mechanism for displacement relative to the valve chamber for controlling flow to said first and second fluid outlets, wherein displacement of the valve sleeve along the central axis such that the valve sleeve is disposed in alignment with one of the first and second fluid outlets effects closing of the one of the first and second fluid outlets.

11. The by-pass valve as claimed in claim 10, wherein said valve sleeve is generally cylindrical, having an outer diameter sized to correspond to an inner diameter of the valve chamber, the valve sleeve having a closed first end engaging the valve mechanism, the closed first end being provided with at least one flow-through opening to allow the control fluid to pass through the first end, the valve sleeve also having an open second end for receiving an end of a return spring.

12. The by-pass valve as claimed in claim 1, wherein said at least one valve mechanism is a thermal motor comprising:
an outer housing arranged within the valve chamber, the outer housing having a first chamber formed therein housing a first thermal material and a second chamber formed therein housing a second thermal material;
a first piston operably coupled to said first thermal material and disposed along said central axis and adapted for reciprocating movement relative to said first chamber; and a second piston operably coupled to said second thermal material and disposed along said central axis and adapted for reciprocating movement relative to said second chamber;

wherein:
the first thermal material expands upon being heated to a temperature at or above a first activation temperature and contracts upon being cooled below said first activation temperature; and the second thermal material expands upon being heated to a temperature at or above a second activation temperature which is higher than the first activation temperature, and contracts upon being cooled below said second activation temperature.

13. The by-pass valve as claimed in claim 12, wherein the first piston is arranged to abut against an end wall of the valve chamber and the second piston is arranged to abut against the valve member.

14. The by-pass valve as claimed in claim 13, wherein said first piston is adapted to extend out of the first chamber of the outer housing along said central axis in response to said first thermal material being heated to a temperature at or above the first activation temperature and to retract into the first chamber of the outer housing upon the first thermal material being cooled below said first activation temperature, and wherein said second piston is adapted to extend out of the second chamber of the outer housing along said central axis in response to said second thermal material being heated to a temperature at or above the second activation temperature and to retract into the second chamber of the outer housing upon the second thermal material being cooled below said second activation temperature.

15. The by-pass valve as claimed in claim 12, wherein said first and second pistons are arranged at opposite ends of said outer housing of said valve mechanism.

16. The by-pass valve as claimed in claim 12, wherein said valve mechanism is a first valve mechanism, said by-pass valve further comprising a second valve mechanism arranged in series with said first valve mechanism, said second valve mechanism comprising:
a thermal motor including:
an outer housing defining at least one chamber housing a thermal material which expands upon being heated to a temperature at or above a third activation temperature, wherein the third activation temperature is different from the first and second activation temperatures, the thermal material contracting upon being cooled to a temperature below said third activation temperature;
wherein:
the second valve mechanism is disposed in series relative to the first valve mechanism such that one of the first and second pistons of the first valve mechanisms is operably coupled to the thermal motor of the second valve mechanism.

17. The by-pass valve as claimed in claim 16, further comprising:
a third valve mechanism arranged in series and in combination with said first and second valve mechanisms, the third valve mechanism comprising:
a thermal motor including:
an outer housing defining at least one chamber housing a thermal material which expands upon being heated to a temperature at or above a fourth activation temperature, wherein the fourth activation temperature is different from the first, second and third activation temperatures, the thermal material contracting upon being cooled to a temperature below said fourth activation temperature;
wherein:
said third valve mechanism being disposed within the valve chamber relative to the first and second valve mechanisms such that the third valve mechanism shares the other one of said first and second pistons with said first valve mechanism.

18. The by-pass valve as claimed in claim 17, wherein:
said first piston is adapted to extend out of the first chamber of the outer housing of the first valve mechanism along said central axis in a first direction with respect to said first valve mechanism in response to said first thermal material being heated to a temperature at or above the first activation temperature and to retract into the first chamber of the first valve mechanism upon the first thermal material being cooled below said first activation temperature, displacement of said first piston effecting displacement of said second valve mechanism relative to the valve chamber along said central axis in said first direction;

said first piston is adapted to extend out of the outer housing of the second valve mechanism, along said central axis, in a second direction that is opposite to said first in response to said thermal material in said second valve mechanism being heated to a temperature at or above the third activation temperature, displacement of said first piston in said second direction effecting displacement of said second valve mechanism along said central axis in said first direction;

said second piston is adapted to extend out of the second chamber of the first valve mechanism along said central axis in said second direction in response to said second thermal material being heated to a temperature at or above the second activation temperature, displacement of said second piston in said second direction effecting displacement of said first and second valve mechanisms along said central axis in said first direction; and said second piston is adapted to extend along said central axis in said first direction in response to said thermal material in said third valve mechanism being heated to a temperature at or above the fourth activation temperature, displacement of said second piston relative to said third valve mechanism in said first direction effecting displacement of said first and second valve mechanisms along said central axis in said first direction.

19. The by-pass valve as claimed in claim 1, wherein a return spring is mounted within said valve chamber for biasing said valve member to return to said neutral position.

* * * * *